Dec. 18, 1962 E. V. BUNTING ETAL 3,068,894
PRESSURE RELIEF VALVE FOR TRACTOR HYDRAULIC SYSTEMS
Filed Nov. 3, 1959 2 Sheets-Sheet 1

INVENTORS.
ERNEST V. BUNTING &
BY GLENNARD T. OLSON

Wolfe, Hubbard, Voit & Osann

ATTORNEYS.

Dec. 18, 1962 E. V. BUNTING ETAL 3,068,894
PRESSURE RELIEF VALVE FOR TRACTOR HYDRAULIC SYSTEMS
Filed Nov. 3, 1959 2 Sheets-Sheet 2

INVENTORS.
ERNEST V. BUNTING &
BY GLENNARD T. OLSON

Wolfe, Hubbard, Voit & Osann

ATTORNEYS.

United States Patent Office 3,068,894
Patented Dec. 18, 1962

3,068,894
PRESSURE RELIEF VALVE FOR TRACTOR HYDRAULIC SYSTEMS
Ernest V. Bunting and Glennard T. Olson, Detroit, Mich., assignors to Massey-Ferguson Inc., Racine, Wis., a corporation of Maryland
Filed Nov. 3, 1959, Ser. No. 850,569
2 Claims. (Cl. 137—514)

The invention relates to tractor hydraulic systems and it is more particularly concerned with an improved pressure relief valve for use in such systems.

One object of the invention is to provide a pressure relief valve for hydraulic systems of the above general character which minimizes entrainment of air and production of foam in the oil discharged through the valve to relieve the pressure in the system.

Another object is to provide a relief valve that is efficient and reliable in operation yet simple and inexpensive in construction. An ancillary object is to provide a relief valve which is quiet in operation.

A further object is to provide a relief valve that can be set with a high degree of precision at the factory and which is completely tamperproof so that the setting cannot be changed in the field.

Other objects and advantages of the invention will become apparent from the following detailed description of the preferred embodiment illustrated in the accompanying drawings, in which FIGURE 1 is a sectional view through the pump and valve assembly of a tractor hydraulic system embodying the features of the invention.

While a preferred form of the invention and its application to a particular tractor hydraulic system has been shown and will be discussed in detail, it is to be understood that this is merely exemplary and is not intended to limit the invention to the specific form or application shown. The intention is to cover all modifications and adaptations falling within the spirit and scope of the invention as more broadly or generally characterized in the appended claims.

Figure 1:
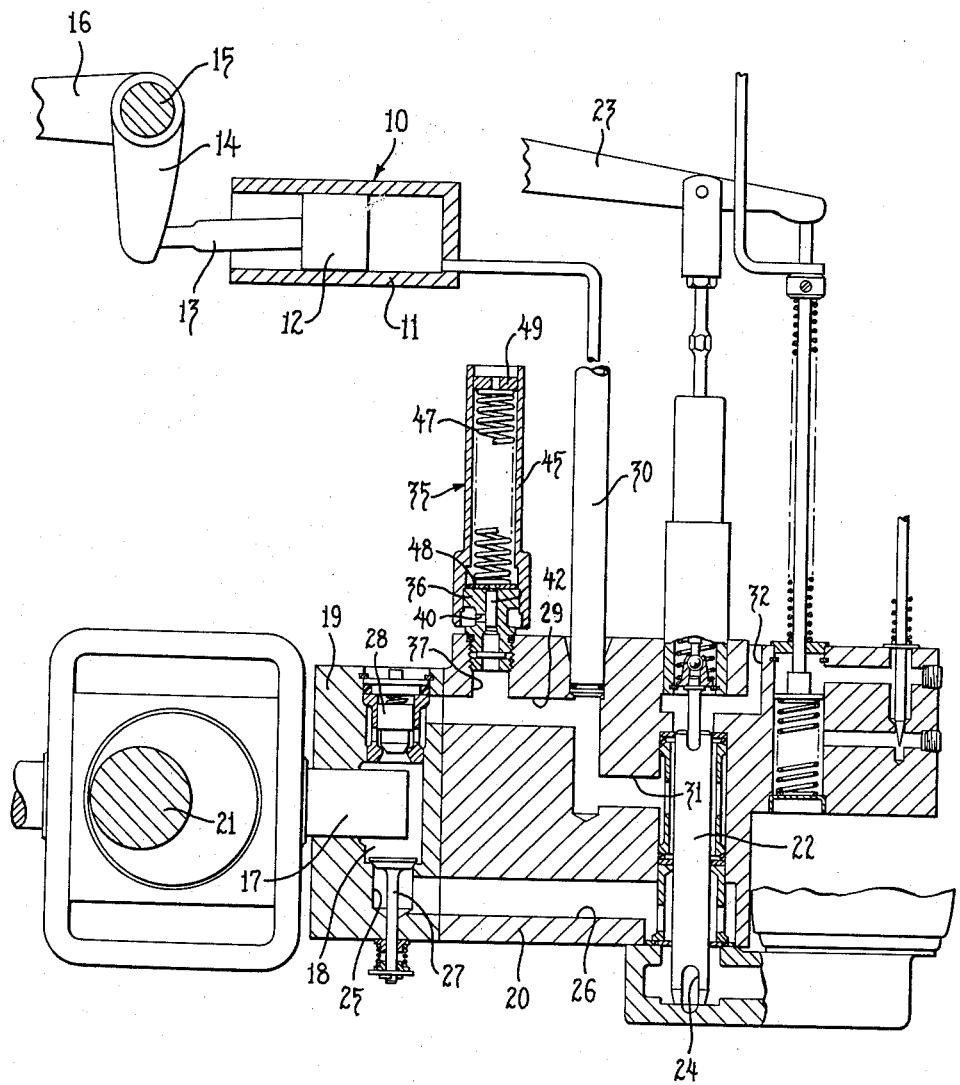

For purposes of illustration, the invention has been shown in a form particularly suitable for use in tractor hydraulic systems which utilize a hydraulic actuator 10 for raising and lowering the hitch linkage by which an implement is coupled to the tractor. As shown in FIG. 1, the actuator 10 comprises a cylinder 11 fitted with a piston 12 which is connected by a piston rod 13 with a crank arm 14 fixed on a rock shaft 15 journaled on the tractor body. The shaft 15 is operatively coupled with the hitch linkage in a well-known manner by means of lift arms 16 so that upon admission of pressure fluid to the closed end of the cylinder the shaft is rocked in a direction to raise the linkage and attached implement. When fluid is permitted to exhaust from the cylinder, the weight of the implement or other load on the linkage forces the piston back into the cylinder allowing the linkage and its load to descend.

In the exemplary hydraulic system the pressure fluid is supplied to the actuator by a piston type pump, of which one piston 17 has been shown in FIG. 1. The piston is reciprocated in a cylinder 18 formed in a housing 19 with which a valve casing 20 is assembled as a unit. Reciprocation of the piston 17 is effected by an eccentric 21 on a shaft driven continuously from the tractor engine.

The operation of the actuator is controlled by a main valve having a plunger 22 reciprocable in a valve bore in the casing 20 and connected by cored or drilled passages with the pump, the actuator and various control devices. The shifting of the valve plunger is effected through the medium of an operating lever 23 which may be actuated either automatically or manually in a manner well-known in the tractor art. The arrangement is such that when the plunger is moved upwardly it opens a port 24 to permit fluid such as oil to enter the pump inlet 25 by way of a passage 26 formed in the valve and pump casings, the valve assembly being submerged in oil in a sump or reservoir provided in the tractor body.

The pump inlet 25 is fitted with a spring biased valve 27 which permits oil to enter the cylinder 18 as the piston executes its suction stroke. In the pressure stroke of the piston, oil is forced from the cylinder through an outlet port fitted with a spring biased check valve 28. Pressure fluid is directed by way of a passage 29 in the valve casing and a conduit 30 to the closed end of the cylinder 11. To exhaust fluid from the actuator cylinder, the valve plunger is shifted downwardly to open an exhaust port 31 through which the fluid is discharged by way of a passage 32 leading to the sump. In the exhaust position, the valve plunger closes the pump inlet, thus interrupting the delivery of pressure fluid by the pump. In practice, the valve plunger 22 is dimensioned so that both the pump inlet and exhaust ports are closed when the plunger is in a central or neutral position.

Tractor hydraulic systems of the type above described operate at pressures ranging upwardly to a maximum of 2500 to 3000 pounds per square inch and the components of the system are designed and built to function at such pressures. However, in the operation of the tractor, conditions frequently arise which tend to raise the hydraulic pressure above that maximum. For example, the implement coupled to the hitch linkage may be snagged on a stump or other obstruction which imposes an abnormal load on the lift mechanism. As the pump continues to deliver fluid to the stalled actuator, excessive pressure may be developed quickly with consequent damage to the system components unless relieved. The invention provides a practical and efficient relief valve 35 for relieving the pressure in the system under such conditions and preventing it from rising to a dangerous level.

The improved relief valve 35 includes a generally cylindrical body 36 reduced in diameter and externally threaded at one end for engagement with internal threads formed in the port provided in the structure with which it is to be associated, in this instance, a port in the valve casing 20. The port 37, as shown in FIG. 1, connects with the pressure supply passage 29 in the valve casing.

Figure 3:
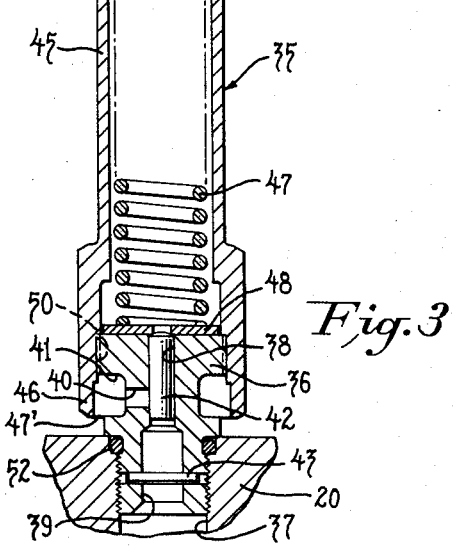
FIG. 3 is a sectional view through the relief valve taken in a plane substantially on the line 3—3 of FIG. 2.

As shown in FIG. 3, the valve body 36 is formed with an axially disposed stepped bore including an outer section 38 and an inner section 39, the latter being somewhat larger in diameter than the section 38. The bore section 38 opens intermediate its end through a radial passage 40 to an outwardly opening groove 41 in the peripheral wall of the valve body. Fluid flow through the passage 40 is controlled by a plunger 42 closely fitted in the bore section 38 and slidable axially to cover or expose the entrance to the passage. A cross pin 43 inserted through alined holes in the bore section 39 serves to retain the pin in the valve bore in the absence of fluid pressure on its lower end.

The outer end of the valve body 36 is telescoped into the lower end of a tubular housing member 45, the member being pressed down on the body so that its lower end defines a skirt 46 extending over the groove 41. The skirt portion of the housing member may be counterbored or the intermediate portion of the valve body reduced in diameter to define a restricted, downwardly opening outlet 47' from the groove. Thus, when the relief valve is opened, the skirt is positioned to intercept the stream of high pressure fluid issuing from the passage 40. Agitation or churning of the oil is reduced to a minimum and localized in the chamber formed by the groove and skirt. The outlet 47' is preferably dimensioned so that a limited amount of back pressure is developed and the fluid passes through the outlet in a solid stream. Entrainment of air in the fluid is thus reduced to a minimum and foaming is substantially eliminated.

Housed within the tubular member 45 is a coiled compression spring 47 normally acting through a washer 48 to hold the valve plunger 42 in a position to close the exhaust passage 40 against the pressure exerted on the plunger by the fluid entering through the valve bore section 39. The spring is retained in the housing and its tension is preset by a plug 49 seated in the outer end of the housing as described in more detail hereinafter.

The washer 48 is preferably fitted relatively closely to the walls of the housing 45 to enable it when displaced by the plunger to trap fluid above the valve body 36. Paths for slow leakage of fluid into and out of the space between the washer and the valve body are provided by grooves 50 in the peripheral wall of the body member 36. These grooves may be formed by knurling the body and in addition to providing the passages, they assist in locking the body to the housing when the latter is pressed in place thereon.

As a further means of simplifying the construction of the valve and to make it tamperproof, the plug 49 is press fitted into the housing 45 and positioned to apply the required preload to the spring 47 as a part of the assembly operation at the factory. The peripheral edge of the plug may be knurled to preclude any possible slippage in use. In the assembly of the valve, the plug 49 is inserted in position and, while the plunger 42 is subjected to pressure approaching that at which the valve is to open, the plug is forced down in the housing to increase the spring tension until it is just sufficient to force the plunger back to closed position. Due to its press fit with the housing, the plug will remain in fixed position after the setting force is withdrawn and the spring 47 will be maintained at the proper tension for holding the valve closed until the predetermined relief pressure is reached or exceeded.

It will be evident that the above construction enables the valve spring to be preset at the factory in a simple and expeditious manner and with a high degree of precision. It will also be evident that the setting of the valve is permanent and since the housing is press fitted to both the plug and the valve body, it cannot be changed in the field. The maintenance of adequate operating pressures at all times is insured and the system is effectively protected against excessive pressures.

Figure 2:
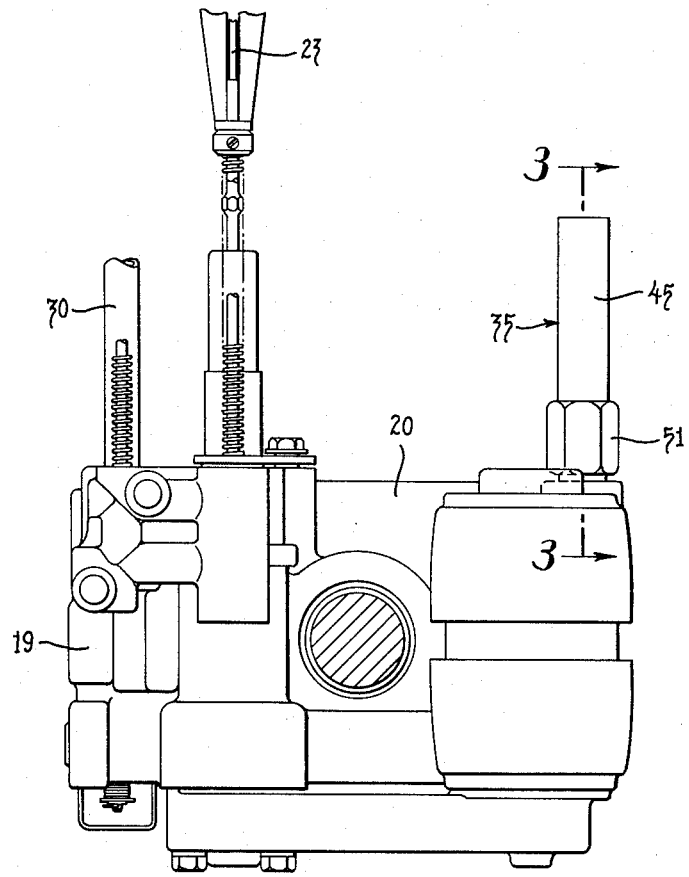
FIG. 2 is an elevational view of the assembly shown in FIG. 1.

The valve 35 is preferably installed in an upright position as shown in FIGS. 1 and 2. In the exemplary embodiment the end of the valve body is screwed into the valve casing 20, the port connecting with the pressure fluid supply passage from the pump as before explained. For convenience in installing and removing the valve, the lower end portion of the housing 45 may be somewhat enlarged and formed with flattened sides 51 as shown in FIG. 2 for engagement by a wrench or comparable tool. A sealing ring or gasket 52 is desirably interposed between the body 36 and the casing 20 to preclude leakage of fluid around the valve.

In the normal operation of a tractor hydraulic system equipped with the improved relief valve 35, the plunger 42 is held in closed position by the spring 47 against the pressure exerted on the inner end of the plunger by the fluid in the passage 29. If for any reason the pressure in the system exceeds the predetermined pressure for which the valve is set, plunger 42 is forced outwardly against the action of the spring 47 until the passage 40 is opened to the interior of the valve, thus allowing the fluid to flow back to the sump until the pressure drops to a value corresponding to the valve setting.

The discharged fluid, being under relatively high pressure, is directed into the groove 41 in the valve body more or less as a jet and this jet is intercepted by the skirt 46 which localizes any churning tending to produce foam. The fluid is then discharged in a solid stream through the annular outlet 47'. Outlet 47' is slightly restricted and produces a limited amount of back pressure which forces some fluid through the grooves 50 into the space between the washer 48 and the valve body. The fluid thus trapped prevents sudden movements of the valve plunger as it must be exhausted slowly through the grooves 50 and around the periphery of the washer in the closing movement of the valve plunger. Any tendency of the plunger to vibrate is thereby eliminated.

The improved valve is simple in construction and inexpensive to manufacture. Considerable costly machining is eliminated by the construction which permits the parts to be assembled by press fitting. Moreover, this construction makes the valve tamperproof so that its factory setting cannot be changed in the field. The initial setting of the valve may be effected at the factory in a simple and expeditious manner and with a high degree of precision. In general, it will be apparent that the invention provides a simple and practical valve which is capable of effectively protecting the tractor hydraulic system against damage from excessive pressure. It is quiet in operation and by minimizing aeration and foaming of the fluid, insures a supply of suitable fluid in the system at all times.

We claim as our invention:

1. A hydraulic relief valve comprising, in combination, a tubular valve body having a bore communicating at one end with a source of fluid under pressure, an outlet passage extending radially from said bore, a plunger reciprocable in said bore with one end exposed to the pressure of the fluid entering the bore, means for yieldably urging said plunger to a position to close said outlet passage comprising a spring having one of its ends arranged to apply pressure against the other end of the plunger, a tubular housing press fitted over said valve body and enclosing said spring, and a plug in said housing forming an abutment for the other end of said spring, said plug being press fitted into said housing to a substantially recessed position effective to impose a predetermined preload on the spring and to prevent easy changing of the preload on said spring, a washer interposed between the spring and the valve plunger, said washer having a close fit with the walls of the housing, said valve body being formed to provide a series of restricted passages for the admission of fluid to, and exhaust of fluid from, the space between the washer and the valve body to damp vibration of the plunger.

2. A hydraulic relief valve comprising, in combination, a tubular valve body having a longitudinal bore with one end connected to receive fluid under pressure and having a transverse bore for discharge of said fluid, a plunger reciprocable in said longitudinal bore for controlling the exhaust of fluid through the transverse bore, a coil spring associated with the plunger to resist movement of the plunger to its exhaust position, a tubular housing secured to said valve body and enclosing said spring, a plug in said housing forming an abutment for said spring, said housing being press fitted into seated position on said valve body and said plug being press fitted into a substantially recessed position in said housing to determine the preload applied to said spring and consequently the fluid pressure required to move said plunger to exhaust position, said transverse bore terminating in an outwardly opening groove in the valve body and the housing being press fitted over the valve body so as to partially overlie said groove and intercept the fluid exhausted from the bore.

References Cited in the file of this patent

UNITED STATES PATENTS

| | | |
|---|---|---|
| 2,164,669 | Thomas | July 4, 1939 |
| 2,361,881 | Sheppard | Oct. 31, 1944 |
| 2,364,812 | Pierson | Dec. 12, 1944 |
| 2,888,947 | Montgomery | June 2, 1959 |
| 2,970,467 | Pettibone | Feb. 7, 1961 |

FOREIGN PATENTS

| | | |
|---|---|---|
| 116,681 | Australia | Mar. 10, 1930 |
| 1,149,979 | France | July 29, 1957 |